(12) United States Patent
Gong et al.

(10) Patent No.: US 10,681,732 B2
(45) Date of Patent: Jun. 9, 2020

(54) METHOD AND APPARATUS FOR COLLISION DETECTION IN WIDER BANDWIDTH OPERATION

(71) Applicant: Intel Corporation, Santa Clara, CA (US)

(72) Inventors: Michelle X. Gong, Sunnyvale, CA (US); Robert J. Stacey, Portland, OR (US); Adrian P Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 14/473,293

(22) Filed: Aug. 29, 2014

(65) Prior Publication Data

US 2014/0369303 A1 Dec. 18, 2014

Related U.S. Application Data

(63) Continuation of application No. 13/076,959, filed on Mar. 31, 2011, now Pat. No. 8,913,510.

(60) Provisional application No. 61/388,231, filed on Sep. 30, 2010.

(51) Int. Cl.
*H04W 74/08* (2009.01)
*H04L 5/00* (2006.01)

(52) U.S. Cl.
CPC ....... *H04W 74/0816* (2013.01); *H04L 5/0062* (2013.01)

(58) Field of Classification Search
CPC .. H04W 74/0816; H04W 28/18; H04L 5/0062
See application file for complete search history.

(56) References Cited

U.S. PATENT DOCUMENTS

| 8,913,510 | B2 | 12/2014 | Gong et al. | |
| 2004/0042424 | A1* | 3/2004 | Hsien-Tsung | H04W 74/0816 370/328 |
| 2006/0029073 | A1 | 2/2006 | Cervello et al. | |
| 2007/0133490 | A1 | 6/2007 | Kwon | |
| 2007/0297353 | A1* | 12/2007 | Habetha | H04W 74/02 370/310 |
| 2008/0080553 | A1* | 4/2008 | Hasty | H04L 1/0002 370/468 |
| 2008/0192707 | A1 | 8/2008 | Xhafa et al. | |
| 2010/0054230 | A1 | 3/2010 | Sridhara et al. | |

(Continued)

FOREIGN PATENT DOCUMENTS

| CN | 1973492 A | 5/2007 |
| CN | 101331787 A | 12/2008 |

(Continued)

OTHER PUBLICATIONS

Stacey, et. al, IEEEP802.11 Wireless LANs Specification Framework for TGac, Jul. 15, 2010, whole document.*

(Continued)

*Primary Examiner* — Un C Cho
*Assistant Examiner* — Jose L Perez
(74) *Attorney, Agent, or Firm* — Schwegman Lundberg & Woessner, P.A.

(57) ABSTRACT

Embodiments of systems and methods for providing collision detection in a wider bandwidth are generally described herein. Other embodiments may be described and claimed.

4 Claims, 5 Drawing Sheets

(56) References Cited

U.S. PATENT DOCUMENTS

| | | | |
|---|---|---|---|
| 2010/0177757 A1 | 7/2010 | Kim et al. | |
| 2010/0260133 A1 | 10/2010 | Sampath et al. | |
| 2010/0284393 A1* | 11/2010 | Abraham | H04L 5/0023 370/343 |
| 2010/0316150 A1* | 12/2010 | Amini | H04W 74/02 375/260 |
| 2011/0110351 A1* | 5/2011 | Seok | H04W 4/20 370/338 |
| 2011/0194542 A1* | 8/2011 | Kim | H04W 72/0453 370/338 |
| 2011/0194644 A1 | 8/2011 | Liu et al. | |
| 2011/0261708 A1* | 10/2011 | Grandhi | H04L 5/0048 370/252 |
| 2011/0305156 A1* | 12/2011 | Liu | H04L 43/0888 370/252 |
| 2012/0026997 A1* | 2/2012 | Seok | H04L 5/001 370/338 |
| 2012/0044844 A1* | 2/2012 | Trainin | H04L 12/413 370/310 |
| 2012/0082040 A1 | 4/2012 | Gong et al. | |
| 2012/0087316 A1* | 4/2012 | Merlin | H04W 28/26 370/329 |
| 2012/0134324 A1* | 5/2012 | Chu | H04W 74/0816 370/329 |
| 2012/0207036 A1* | 8/2012 | Ong | H04W 74/0816 370/252 |
| 2012/0243485 A1* | 9/2012 | Merlin | H04W 28/20 370/329 |
| 2012/0320856 A1* | 12/2012 | Kim | H04W 28/26 370/329 |

FOREIGN PATENT DOCUMENTS

| | | | | |
|---|---|---|---|---|
| CN | 103250459 | A | 8/2013 | |
| CN | 103250459 | B | 6/2016 | |
| CN | 105792279 | A | 7/2016 | |
| CN | 105792279 | B | 11/2019 | |
| EP | 2622930 | B1 | 12/2018 | |
| JP | 2007214920 | A | 8/2007 | |
| JP | 2008503958 | A | 2/2008 | |
| JP | 2008517566 | A | 5/2008 | |
| JP | 2009513067 | A | 3/2009 | |
| JP | 2010178086 | A | 8/2010 | |
| JP | 2013541293 | A | 11/2013 | |
| JP | 6038969 | B2 | 12/2016 | |
| KR | 100772535 | B1 | 11/2007 | |
| KR | 1020100067894 | A | 6/2010 | |
| KR | 1020150038632 | A | 4/2015 | |
| KR | 1020150104647 | A | 9/2015 | |
| KR | 101560071 | B | 10/2015 | |
| KR | 101560528 | B | 10/2015 | |
| KR | 101629625 | B1 | 6/2016 | |
| KR | 1020160068001 | A | 6/2016 | |
| KR | 101666861 | B1 | 10/2016 | |
| WO | WO-2006000955 | A1 | 1/2006 | |
| WO | WO-2006045097 | A2 | 4/2006 | |
| WO | WO-2007048118 | A1 | 4/2007 | |
| WO | WO-2009154406 | A2 | 12/2009 | |
| WO | WO-2009154406 | A2 * | 12/2009 | H04W 4/20 |
| WO | WO-2011099791 | A2 * | 8/2011 | H04W 74/0816 |
| WO | WO-2012040495 | A1 | 3/2012 | |
| WO | WO-2012044706 | A1 | 4/2012 | |

OTHER PUBLICATIONS

"U.S. Appl. No. 13/076,959, Response filed Jul. 15, 2013 to Non Final Office Action dated Apr. 15, 2013", 12 pgs.
"U.S. Appl. No. 13/076,959, Final Office Action dated Nov. 5, 2013", 30 pgs.
"U.S. Appl. No. 13/076,959, Non Final Office Action dated Apr. 15, 2013", 23 pgs.
"U.S. Appl. No. 13/076,959, Notice of Allowance dated Feb. 3, 2014", 8 pgs.
"U.S. Appl. No. 13/076,959, Notice of Allowance dated Aug. 15, 2014", 7 pgs.
"U.S. Appl. No. 13/076,959, Preliminary Amendment filed Jan. 12, 2012", 9 pgs.
"U.S. Appl. No. 13/076,959, Response filed Jan. 13, 2014 to Final Office Action dated Nov. 5, 2013", 14 pgs.
"Draft Standard for Information Technology—Telecommunications and information exchange between systems—Local and metropolitan area networks—Specific requirements, Part 11: Wireless LAN Medium Access Control (MAC) and Physical Layer (PHY) specification", Amendment 5: Enhancements for Very High Throughput for Operation in Bands below 6 GHz, IEEE P802.11ac™/D1.0, (May 2011), 263.
"International Application Serial No. PCT/US2011/053758, International Preliminary Report on Patentability dated Jan. 11, 2013", 5 pgs.
"International Application Serial No. PCT/US2011/053758, International Search Report dated Feb. 27, 2012", 3 pgs.
"International Application Serial No. PCT/US2011/053758, Written Opinion dated Feb. 27, 2012", 4 pgs.
"Japanese Application Serial No. 2013-531781, Office Action dated Mar. 11, 2014", 6 pgs.
"Transmission Rules Within a Txop for wider Bandwidth Operation", U.S. Appl. No. 13/040,821, filed Mar. 4, 2011, 40 pgs.
Gong, et al., "Enhanced Carrier Sensing for Multi-Channel Operation", U.S. Appl. No. 12/748,678, filed Mar. 29, 2010, 29 pgs.
Kerry, et al., "IEEE Standard for Information Technology—Telecommunications and information exchange between systems—Local and metropolitan area networks—Specific requirements Part 11: Wireless LAN Medium Access Control (MAC) and Physical Layer (PHY) Specifications", 17.3.8.3.1 Operating frequency range, (Jun. 12, 2007), 587 pg.
Stacey, et al., "IEEE P802.11 Wireless LANs Specification Framework for TGac", (Jul. 15, 2010).
"Chinese Application Serial No. 201180057680.5, Office Action dated Jul. 20, 2015", w/ English Translation, 7 pgs.
"European Application Serial No. 11829837.1, Extended European Search Report dated Jul. 7, 2015", 7 pgs.
"Korean Application Serial No. 10-2013-7011045, Office Action dated Jun. 26, 2015", w/ English Translation, 6 pgs.
"Korean Application Serial No. 10-2013-7011045, Office Action dated Dec. 8, 2014", w/ English Translation, 9 pgs.
"Korean Application Serial No. 10-2013-7011045,Response filed Aug. 26, 2015 to Office Action dated Jun. 26, 2015", w/ English Claims, 13 pgs.
"Korean Application Serial No. 10-2015-7006096, Amendment filed Jun. 19, 2015", w/ English Claims, 6 pgs.
Li, Nan, "RTS&CTS Exchange in wideband transmission; 11-10-1066-02-00ac-rts-cts-exchange-in-wid eband-transmission", IEEE Draft; 11-10-1066-02-00AC-RTS-CTS-Exchange-In-Wid Eband-Transmission, IEEE-SA Mentor, Piscataway, NJ USA, vol. 802. 11ac, No. 2, (Sep. 16, 2010), 1-8.
"Chinese Application Serial No. 201180057680.5, Response filed Dec. 4, 2015 to Office Action dated Jul. 20, 2015", w/ English Claims, 12 pgs.
"European Application Serial No. 11829837.1, Invitation pursuant to Article 94(3) and Rule 71(1) EPC dated Dec. 20, 2016", 4 pgs.
"Japanese Application Serial No. 2015-010997, Office Action dated Jan. 26, 2016", With English translation, 3 pgs.
"Japanese Application Serial No. 2015-010997, Response filed Apr. 21, 2016 to Office Action dated Jan. 26, 2016", with English translation of claims, 9 pgs.
"Korean Application Serial No. 10-2015-7023242, Notice of Preliminary Rejection dated Jan. 4, 2016", With English translation, 5 pgs.
"Korean Application Serial No. 10-2015-7023242, Response filed Mar. 4, 2016 to Notice of Preliminary Rejection dated Jan. 4, 2016", w/ English Claims, 12 pgs.
"European Application Serial No. 11829837.1, Response filed Feb. 13, 2018 to Communication Pursuant to Article 94(3) EPC dated Oct. 13, 2017", 14 pgs.

(56) References Cited

OTHER PUBLICATIONS

"European Application Serial No. 11829837.1, Communication Pursuant to Article 94(3) EPC dated Oct. 13, 2017", 6 pgs.
"Chinese Application Serial No. 201610346930.1, Office Action dated Jul. 30, 2018", w/ English translation, 13 pgs.

* cited by examiner

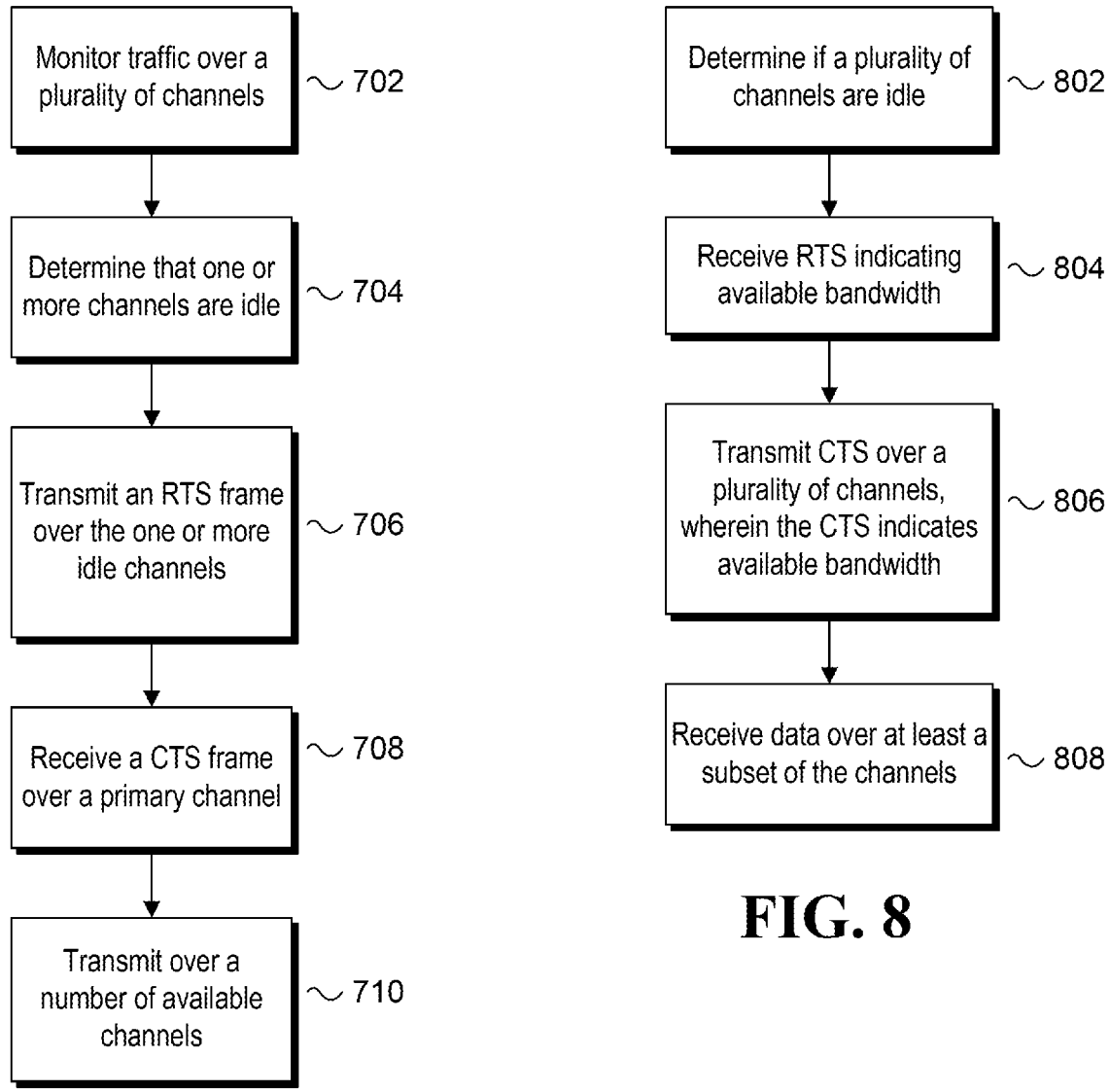

METHOD AND APPARATUS FOR COLLISION DETECTION IN WIDER BANDWIDTH OPERATION

REFERENCE TO RELATED INVENTIONS

This application is a continuation of U.S. application Ser. No. 13/076,959, filed Mar. 31, 2011, which claims priority to U.S. Provisional Patent Application No. 61/388,231 filed Sep. 30, 2010, both of which are incorporated herein by reference in their entirety.

FIELD OF THE INVENTION

This application relates to wireless systems and, more particularly, to systems and methods for co-existence of transmissions in one or more wireless networks.

BACKGROUND

An increased throughput, e.g., above 1 Gigabit-per-second (Gbps) per wireless communication client, may be required to satisfy a demand for transferring increased amounts of data within wireless communication networks or basic service sets (BSS), such as wireless local area networks (WLAN) and/or wireless personal area networks (WPAN). The increased throughput may be achieved by using a communication link having a wide bandwidth. For example, a bandwidth of 40 Mega-Hertz (MHz) or more using a plurality of channels may be required to provide high throughput in a network operating over one or more frequency bands in accordance with the IEEE 802.11 standards.

The plurality of wireless communication channels can be used across a number of BSSs, wherein one BSS overlaps one or more other BSSs. Collisions can occur when one BSS occupies a channel of another BSS, wherein traffic over a channel in a first BSS collides with traffic over the channel in a second BSS. Stations (STA) within the first BSS may be hidden and not otherwise known or detected within the second BSS. The presence of hidden nodes or STAs within the range of a BSS can lead to collisions within the BSS.

BRIEF DESCRIPTION OF THE DRAWINGS

The present invention is illustrated by way of example and not as a limitation in the figures of the accompanying drawings, in which:

FIG. 7 is a block diagram illustration of methods for collision detection in wideband transmission, in accordance with some demonstrative embodiments; and FIG. 8 is a block diagram illustration of methods for collision detection in wideband transmission, in accordance with some demonstrative embodiments.

DETAILED DESCRIPTION

Figure 1:
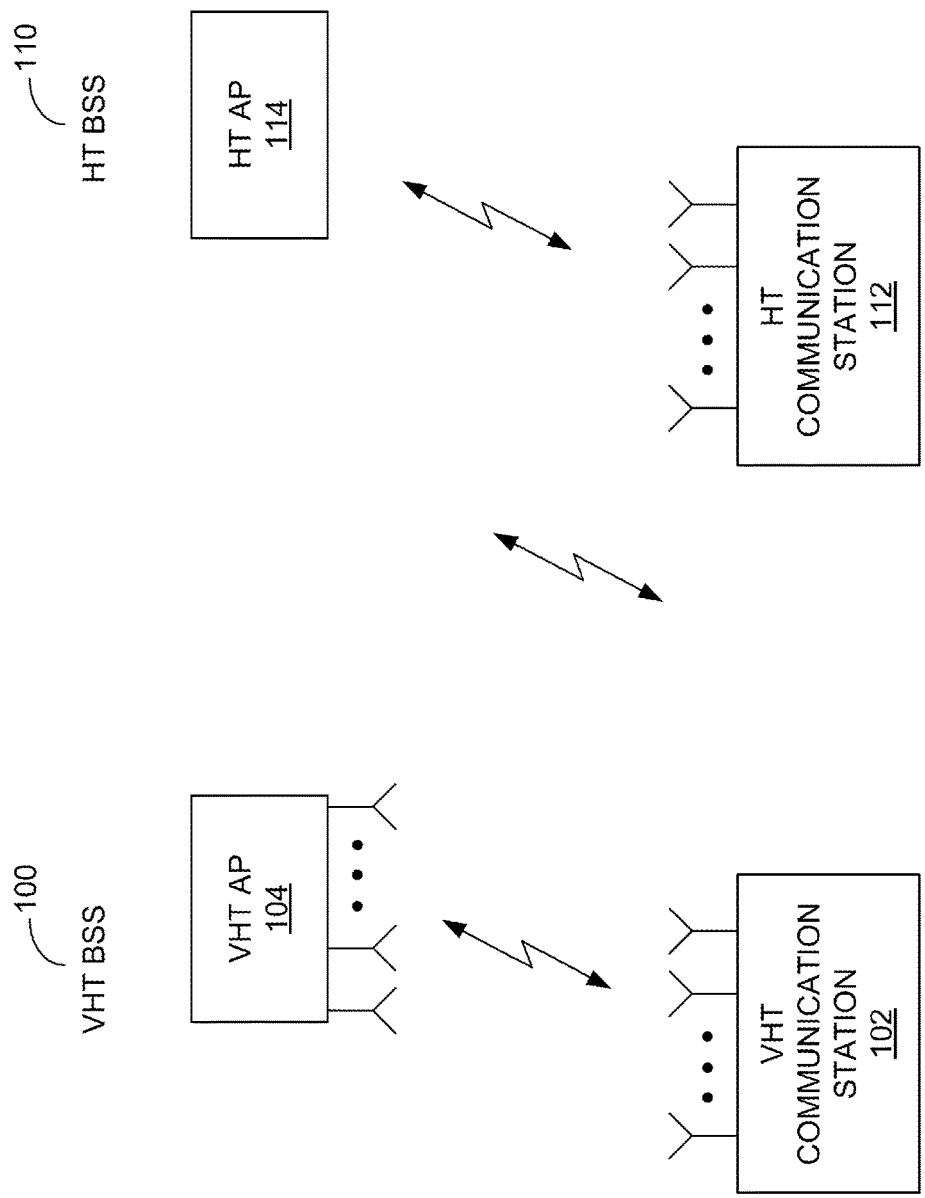
FIG. 1 is an schematic block diagram illustration of neighboring wireless communication networks, in accordance with some demonstrative embodiments.

In the following detailed description, numerous specific details are set forth in order to provide a thorough understanding of embodiments of the invention. However it will be understood by those skilled in the art that embodiments of the invention may be practiced without these specific details. In other instances, well-known methods, procedures, components and circuits have not been described in detail so as not to obscure embodiments of the invention.

The following detailed description describes various embodiments for communication using a device such as a platform, user equipment (UE), subscriber station (SS), station (STA), mobile station (MS), advanced mobile station (AMS), high throughput (HT) station (STA), or very HT STA (VHT STA). The various forms of devices described above such as the platform, UE, SS, MS, HT STA, and VHT STA may be interchanged and reference to a particular device does not preclude other devices from being substituted in various embodiment(s). The device can communicate in a network with one or more other devices such as a base station (BS), access point (AP), node, node B, or enhanced node B (eNB). Further, these terms may be conceptually interchanged, depending on which wireless protocol is being used in a particular wireless network, so a reference to BS herein may also be seen as a reference to either of ABS, eNB, HT AP, VHT AP or AP as one example. Similarly, a reference to MS herein may also be seen as a reference to either of HT STA, VHT STA, or SS as another example. Reference to a particular device does not preclude other devices from being substituted in various embodiment(s).

Some embodiments may be used in a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 (IEEE Standard for Information technology—Telecommunications and information exchange between systems—Local and metropolitan area networks—Specific requirements, Part 11: Wireless LAN Medium Access Control (MAC) and Physical Layer (PHY) Specifications—June 2007), 802.11n, 802.11 task group ac (TGac), 802.11 task group ad (TGad). Further, networks operating in accordance with 802.16 (IEEE-Std 802.16, 2004 Edition, Air Interface for Fixed Broadband Wireless Access Systems), 802.16d, 802.16e (IEEE-Std 802.16e, 2005 Edition, Physical and Medium Access Control Layers for Combined Fixed and Mobile Operation in Licensed Bands), 802.16f, 802.16m standards ("the 802.16 standards") and/or future versions and/or derivatives thereof, devices and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof.

In the field of communications, including wireless communications, it would be helpful to reduce interference or collisions for devices that operate using wideband transmissions in wireless environments that include multiple networks or BSSs. For example, devices associated with a first BSS in a wireless environment may be hidden or otherwise not associated with a second network, but can cause interference and/or collisions on the second network. Systems and methods for providing coexistence for wideband and narrower band transmissions in the wireless environment, while avoiding or reducing collisions, can provide improved throughput for the devices in the wireless environment.

FIG. 1 illustrates neighboring wireless communication networks in accordance with some embodiments. The neighboring wireless communication networks include two or more basic service sets (BSS), such as very-high throughput (VHT) BSS 100 and high-throughput (HT) BSS 110, however the embodiment is not so limited. Alternate types wireless communication networks may be substituted and/or added in alternate embodiments. The VHT BSS 100 comprises a VHT access point (AP) 104 and one or more VHT communication stations (STA) 102, and HT BSS 110 comprises neighboring HT AP 114 and one or more HT communication stations (STA) 112. In an embodiment, VHT BSS 100 is configured to operate in accordance with IEEE 802.11ac and the HT BSS 110 is configured to operate in accordance with IEEE 802.11n. Other wireless protocols may be used in the alternate embodiments.

VHT BSS 100 may utilize a primary channel and up to three or more non-primary or secondary channels. The HT BSS 110, on the other hand, may be limited to using a primary channel, or a primary channel and a secondary channel. The primary channel is a communications channel in the wireless communication network associated with a station. In embodiments, the station may perform carrier sensing functions and send data along the primary channel and optionally along a number of secondary channels. VHT communication station 102 and HT communication station 112 may utilize a contention-based collision-avoidance protocol such as the CSMA/CA protocol to contend for access on one or more channels.

In accordance with some embodiments, VHT communication station 102 is configured to communicate a data unit, such as a physical layer convergence procedure (PLCP) protocol data unit (PPDU), on a primary channel and up to three or more non-primary channels, and HT communication station 112 is configured to communicate a PPDU on a primary channel, or a primary channel and one secondary channel. In embodiments, the VHT communication station 102 is configured to reduce collisions that may occur with HT communication station 112 by detecting packets on the primary and/or non-primary channels used by the VHT BSS 100.

Figure 2:
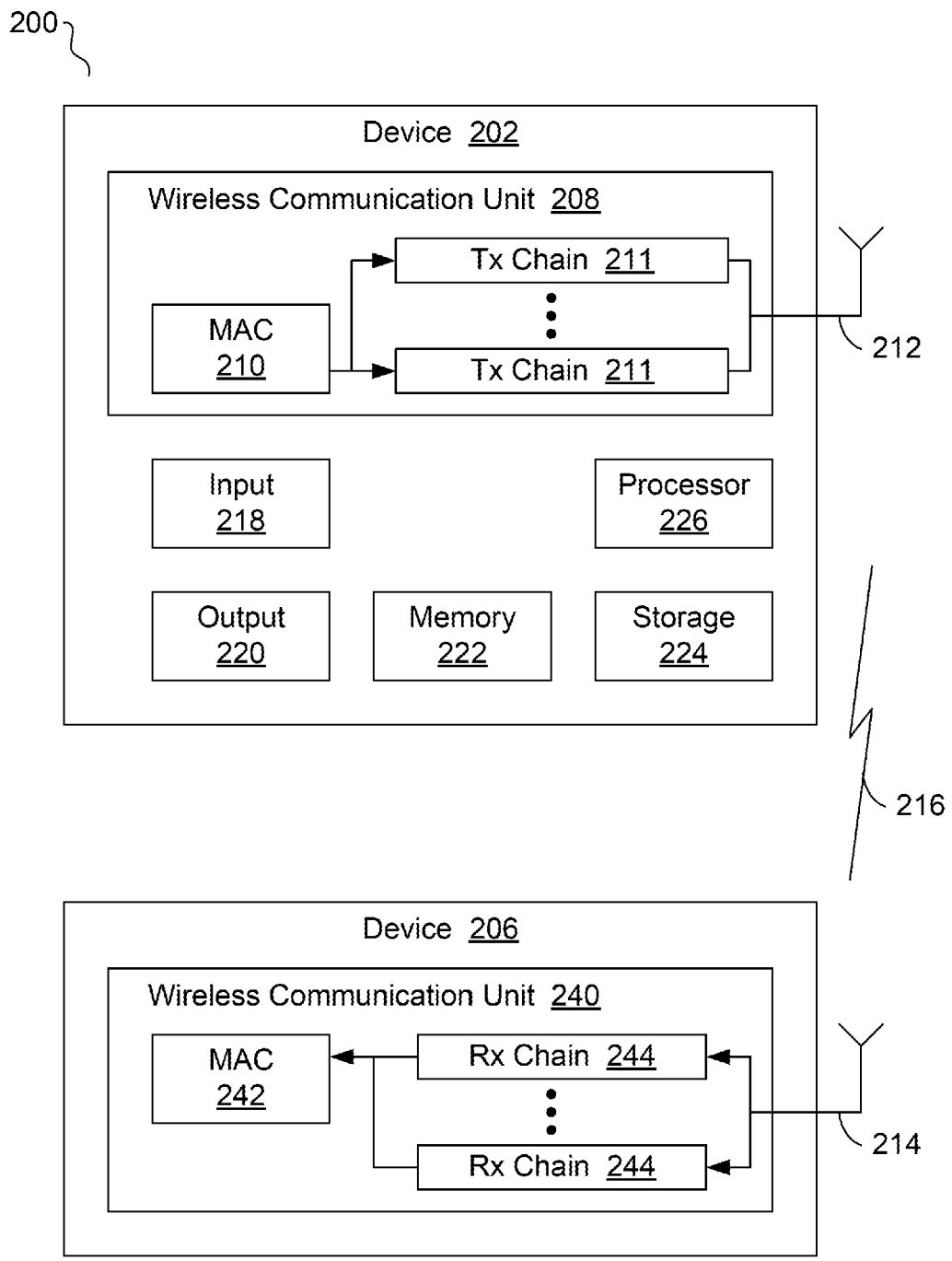
FIG. 2 is a schematic block diagram illustration of a system, in accordance with some demonstrative embodiments.

Reference is now made to FIG. 2, which schematically illustrates a block diagram of a system 200 in accordance with some demonstrative embodiments. In some demonstrative embodiments, system 200 may include one or more wireless communication devices, e.g., wireless communication devices 202 and/or 206, capable of communicating content, data, information and/or signals over a wireless communication link 216. One or more elements of system 200 may optionally be capable of communicating over any suitable wired communication links.

In some demonstrative embodiments, wireless communication devices 202 and/or 206 may include the VHT STA 102, the VHT AP 104, the HT STA 112, the HT AP 114, or the like. In some demonstrative embodiments, device 202 includes a wireless communication unit 208 to transmit, via one or more antennae 212, a wireless transmission to device 206 over wireless communication link 216. Device 206 includes a wireless communication unit 240 to receive the wireless transmission via one or more antennae 214. Types of antennae that may be used for antennae 212 and/or 214 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, wireless communication link 216 may have a wideband bandwidth of at least 160 Mega-Hertz (MHz). In other embodiments, wireless communication link 216 may have any other suitable wideband bandwidth, e.g. 80 MHz and 40 MHz. For example, wideband may be 80 MHz in bandwidth and sub-wideband may be 40 MHz or less in bandwidth, though the embodiments are not so limited.

In some demonstrative embodiments, wireless communication devices 202 and/or 206 may also include, for example, one or more of a processor 226, an input unit 218, an output unit 220, a memory unit 222, and a storage unit 224. Wireless communication devices 202 and/or 206 may optionally include other suitable hardware components and/or software components. The wireless communication devices 202 and/or 206 may further comprise transmission and reception capabilities in a single device wherein some or all of the components of each of wireless communication devices 202 and/or 206 may be enclosed in a common housing or packaging, and may be interconnected or operably associated using one or more wired or wireless links. In other embodiments, components of each of wireless communication devices 202 and/or 206 may be distributed among multiple or separate devices.

Processor 226 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 226 executes instructions, for example, of an Operating System (OS) of wireless communication devices 202 and/or 206 and/or of one or more suitable applications.

Memory unit 222 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by wireless communication device 202 and/or 206.

In some demonstrative embodiments, wireless communication link 216 includes a number of contiguous wireless communication channels. The phrase "contiguous channels", as used herein, may refer to two or more wireless communication channels that are adjacent, neighboring, and/or bordering one another. In alternate embodiments, a number of channels may be dis-contiguous wherein two or more wireless communication channels in a channel block or channel segment are non-adjacent or are separated by a frequency range.

Some demonstrative embodiments are described below with reference to a wireless communication link, e.g., wireless communication link 216. In one example, the wireless communication link may include at least one channel having a bandwidth of 80 MHz and at least one channel having a bandwidth different from 80 MHz, e.g., 20 MHz, 40 MHz, 160 MHz and the like. For example, the 80 Mhz channel includes four contiguous 20 MHz channels, e.g., in accordance with the 802.11 standards and/or any other suitable standard and/or protocol.

In some demonstrative embodiments, wireless communication unit 208 may include a plurality of transmit (Tx) chains 211 to transmit the wireless transmission over the plurality of wireless communication channels. Wireless communication unit 240 may include a plurality of receive (Rx) chains 244 to receive the wireless transmission over the plurality of wireless communication channels. In some demonstrative embodiments, Tx chains 211 and/or Rx chains 244 may include any suitable Physical-layer (PHY) chains and/or components; any suitable Radio-Frequency (RF) chains and/or components; and/or any other suitable elements.

In some demonstrative embodiments, wireless communication unit 208 may include a media-access-controller (MAC) 210, e.g., a single MAC, to commonly control the transmissions via Tx chains 211; and/or wireless communication unit 240 may include a MAC 242, e.g., a single MAC, to commonly control the reception via Rx chains 244, e.g., as described in detail below.

In some demonstrative embodiments, MAC 210 may control Tx chains 211 to simultaneously transmit symbols of a wireless communication packet over the plurality of wireless communication channels of wireless communication link 216. MAC 242 may control Rx chains 244 to simultaneously receive the symbols of the wireless communication packet over the plurality of wireless communication channels of wireless communication link 216.

Figure 3:
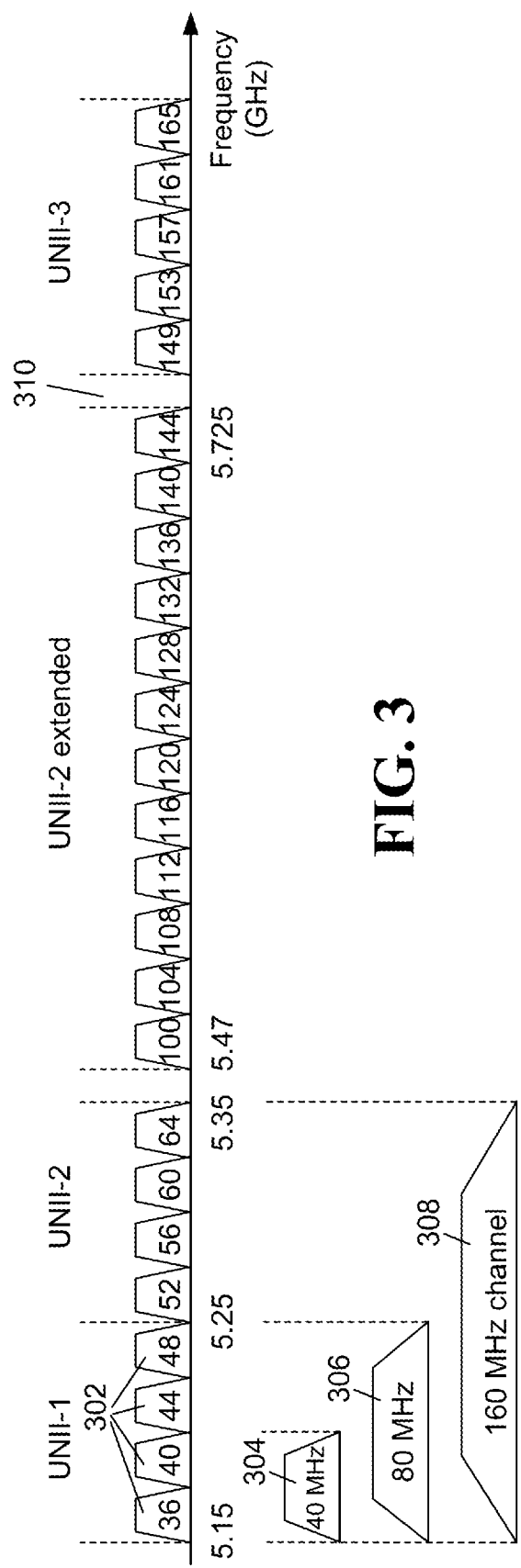
FIG. 3 is a block diagram illustration of channel allocations, in accordance with some demonstrative embodiments.

FIG. 3 is a block diagram illustration of channel allocations, in accordance with some demonstrative embodiments. The block diagram illustrates part of a wireless spectrum in a 5 gigahertz (GHz) band wherein portions of the 5 GHz band are allocated as unlicensed bands and referred to as Unlicensed National Information Infrastructure (UNII) radio bands. Adjoining and/or separate frequency bands in the electromagnetic spectrum may be used in alternate embodiments.

The UNII radio bands are part of the radio frequency spectrum used by IEEE-802.11 devices and many wireless network service providers and is a is an Federal Communications Commission (FCC) regulatory domain for 5-GHz wireless devices in the United States. The UNII radio bands are categorized, for purposes of this application, as a UNII-1 band, a UNII-2 band, a UNII-2 extended band, and a UNII-3 band. The bands may be further categorized according to power limitations, frequency bandwidth, and number of channels allocated to each band wherein the channels may be grouped together.

Reference to particular bands within the 5 GHz band may differ depending on location. For example, the bands illustrated in FIG. 3 reflect embodiments that may apply to the United States. Frequency ranges for each band can change depending on location and may differ in alternate embodiments. As shown in FIG. 3, the UNII-1 band ranges between 5.15 to 5.25 GHz and the UNII-1 band comprises four even-numbered channel blocks ranging from 36 to 48 wherein each channel block represents a 20 MHz channel 302. The 20 MHz channels 302 may be further combined to provide a wider bandwidth, represented as a 40 MHz channel 304, an 80 MHz channel 306, and a 160 MHz channel 308. Reference herein to a channel block may refer to a single channel or may refer to multiple aggregated channels to provide a desired bandwidth for the channel block.

Similarly, the UNII-2 band contains four 20 MHz channels 302 between 5.25 to 5.35 GHz and ranges between even-numbered channel blocks 52 to 64. A UNII-2 extended band, which may also be referred to as a UNII Worldwide band, ranges between 5.47 and 5.725 GHz and contains twelve even-numbered channel blocks from 100 to 144. In this embodiment, a gap 310 follows the UNII-2 extended band and precedes a UNII-3 band. The UNII-3 band extends to 5.825 GHz and contains five odd-numbered channel blocks from 149 to 165. Frequency labels in FIG. 3 refer to established limits for corresponding UNII bands. In alternate embodiments, channel block numbers and the frequency bandwidth that the channels occupy in each band may change depending on regulatory requirements or other limitations.

Transmission of a data stream in a number of channels may vary depending on a wireless protocol used for communications. For example, according to 802.11ac (TGac) draft specification, 80 MHz PHY transmission for the VHT BSS 100 is supported using two adjacent 40 MHz channels. For the 80 MHz transmission, channel blocks 36 and 40 are two adjacent channel blocks, that when combined provide a total bandwidth of 40 MHz. Further, channel blocks 44 and 48 also provide a total bandwidth of 40 MHz. A combination of channel blocks 36, 40, 44, and 48 provide a total contiguous bandwidth of 80 MHz for transmission. The combination of channel blocks 36-48 can provide a first frequency portion for 160 MHz transmission. A second frequency portion for 160 MHz transmission may include channel blocks 52, 56, 60, and 64, wherein the second frequency portion is 80 MHz in bandwidth. The contiguous first and second frequency portions allow for contiguous transmission in a first 160 MHz channel 308. The first frequency portion and the second frequency portion may also be referred to as a lower and upper frequency portion in some embodiments.

Wideband channel communications may also be supported in the UNII-2 extended band and UNII-3 band using a plurality of channel blocks. A contiguous wideband channel in the 5 GHz band may be prevented due to frequency gap 310 as illustrated in FIG. 3. The frequency gap 310 may be 5 MHz or larger in bandwidth (e.g. 10, 15, 20 or the like).

Figure 4:
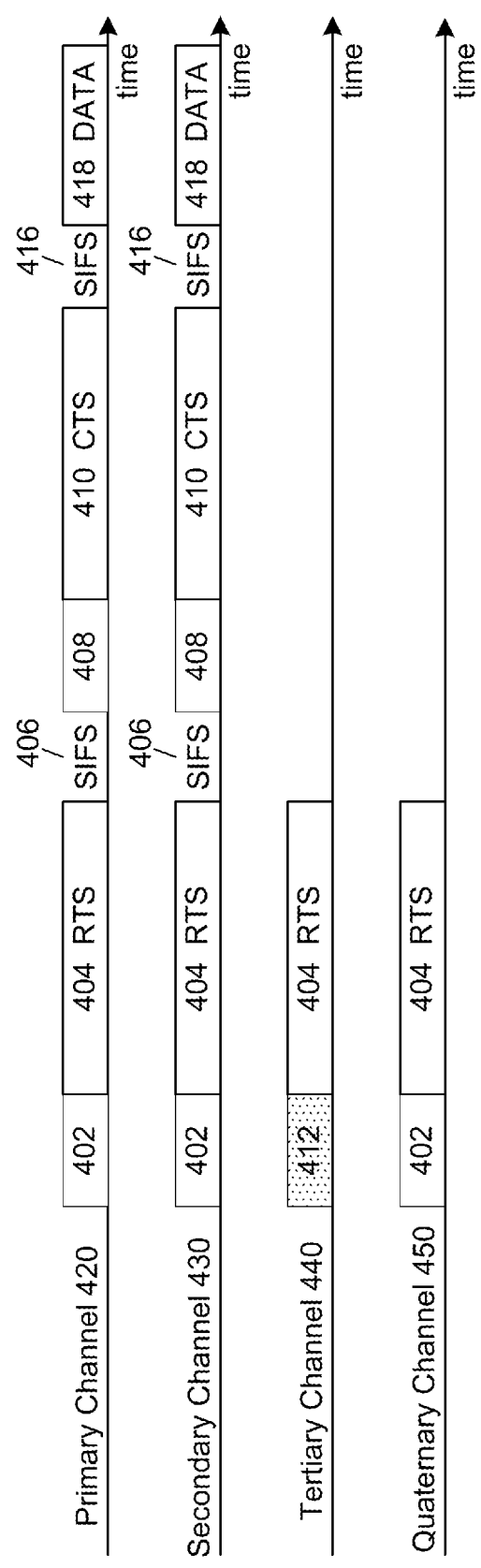
FIG. 4 is a block diagram illustration of collision detection over a plurality of channels, in accordance with some demonstrative embodiments.

FIG. 4 is a block diagram illustration of collision detection over a plurality of channels including a primary channel 420 and non-primary channels including secondary channel 430, tertiary channel 440, and quaternary channel 450, in accordance with some demonstrative embodiments. Fewer or additional channels may be used in alternate embodiments. Each of the channels 420, 430, 440, and 450 may be a 20 MHz channel 302, though the embodiment is not so limited. The channels of FIGS. 4, 5, and 6 may be wider or narrower than 20 MHz in alternate embodiments.

As illustrated in FIG. 4, an initiating device or initiator such as the wireless communication device 202 attempts channel access using request to send (RTS)/clear to send (CTS) frames with a responding device or responder. The initiating device may scan, monitor or otherwise sense each of the channels 420, 430, 440, and 450, wherein the channels are monitored on a continuous or semi-continuous basis to determine if the channels are idle. If idle, the initiating device may dynamically select an available bandwidth based on a channel status and transmit RTS 404 frames comprising RTS preambles 402 to the responding device, such as the wireless communication device 206, using 80 MHz bandwidth over the primary channel 420, secondary channel 430, tertiary channel 440, and quaternary channel 450, for example in preparation to transmit a PPDU over 80 Mhz bandwidth. Alternate bandwidths may be dynamically selected by the initiating device depending on a largest contiguous bandwidth available, e.g. 20 MHz, 40 MHz, or 160 Mhz. Further, a number of bits may be set in the RTS 404 frame and/or RTS preamble 402 to indicate whether the initiating device is using dynamic bandwidth operation.

The responding device can scan to determine a number of idle channels and may detect the RTS 404 frames. The RTS 404 frame can also carry bandwidth indication information that indicates a bandwidth occupied by the RTS 404 frame. Upon receiving a RTS frame, the responding device responds with CTS 410 frames comprising CTS preambles 408 at a widest contiguous bandwidth at which the responding device determines that the channel(s) are idle. In other embodiments, the receiving device senses or scans the channels prior to receiving the number of RTS 404 frames, such as at least a point coordination function (PCF) interframe space (PIFS) prior to receiving the RTS 404 frames, to determine which channels are idle. The initiating and responding devices can operate dynamically, as opposed to a static bandwidth operation wherein if any of the non-primary channels 430, 440, and/or 450 are detected as busy when scanned or sensed by either the initiating device or the responding device, transmission of frames over the primary channel 420 and non-primary channels 430, 440, and 450 is prevented and/or delayed such as by implementing a backoff procedure over the primary channel 420 and, in embodiments, without incrementing a retry counter.

The responding device may successfully detect the RTS 404 frames over the primary channel and may optionally detect the RTS 404 frames over the non-primary channels using one or more measurements parameters, such as a signal to noise ratio (SNR) or signal to interference noise ratio (SINR). The responding device may not detect one or more RTS 404 frames due to a collision over one or more channels, indicating the one or more channels are busy. As an example, a corrupted preamble 412 results from a collision of a RTS preamble 402 over the tertiary channel 440. The corrupted preamble 412 may prevent the responding device from successfully receiving a RTS 404 frame over the tertiary channel 440.

In an embodiment, the responding device implements an interference estimation protocol on the non-primary channels including the secondary channel 430, the tertiary channel 440, and the quaternary channel 450 to estimate interference over a long training field (LTF) of the RTS preamble 402. The interference estimation protocol may include derivation of a SINR using a received signal strength indicator (RSSI) estimated or measured over the primary channel 420 and an interference level measured or estimated over one or more non-primary channels. For example, the responding device may determine the SINR for the tertiary channel 440 using the RSSI of the primary channel 420 and the interference level measured over the tertiary channel 440. In this embodiment, the responding device may determine that a collision occurred over the tertiary channel 440 if the SINR is lower than a pre-determined threshold. The pre-determined threshold may be calculated or determined by the initiating device and/or responding device, or the pre-determined threshold may be provisioned within the initiating device and/or responding device. The responding device sends CTS 410 frames having CTS preambles 408 over the primary channel 420 and the secondary channel 430 after the SIFS 406 to provide a contiguous bandwidth for the initiator to send a subsequent data PPDU following a SIFS 418 using data 420 frames.

The responding device may determine a bandwidth to be used for transfer of the data PPDU based on preamble detection over the non-primary channels and timing-correlation between the primary channel 420 and the non-primary channels 430, 440, and 450. If the responding device receives a RTS 404 with a valid RTS preamble 402 over the primary channel 420 but either a valid RTS preamble 402 is not received over one or more of the non-primary channels 430, 440, and 450, or a valid RTS preamble 402 is detected but very high interference is estimated over one or more of the non-primary channels, the responding device can reduce the transmit bandwidth and transmit CTS 410 frames over a subset of channels for which valid preambles have been received and have been time-correlated with a correctly received RTS 404 frame over the primary channel 420. Collisions may occur during the CTS 410 frames also and the initiating device may detect the collisions and adjust an operating bandwidth in response to the collisions by selecting channels that were collision-free during the RTS 404 frames and the CTS 410 frames.

Dynamic allocation or selection of bandwidth may be provided in embodiments by using a number of bits in the RTS 404 and/or CTS 410 frames. As an example, 2 out of 9 reserved bits in a service field of the RTS 404 frame and/or CTS 410 frame may be used to indicate bandwidth mode. The bits indicating bandwidth mode may be reserved service bits that follow scrambler initialization fields in the RTS 404 and/or the CTS 410 frames. In other embodiments, the RTS 404 may be wrapped in a control wrapper and/or the CTS 410 frames may be wrapped in a control wrapper. The control wrapper may comprise one or more of a frame control field, a duration identifier field, an address field, a carried frame control field, a high throughput control field, a carried frame field, and a frame check sequence field. A number of reserved bits may be set to indicate bandwidth for the RTS 404 frame or the CTS 410 frame in a field of the control wrapper. As an example, two reserved bits in the HT control field may be used to indicate bandwidth. Alternate fields may be used to indicate bandwidth through use of a number of bits.

In alternate embodiments for FIG. 4, the frames may be referred to as multichannel frames such as a multichannel RTS (MRTS) 404 frame and a multichannel CTS (MCTS) 410 frame. An MRTS is an RTS 404 that comprises an embedded list of channels the MRTS is transmitted on. The MRTS 404 frame and the MCTS 410 frame may be configured to identify available bandwidth wherein interference estimation is used to determine whether a collision has been detected, instead of preamble detection as described earlier in reference to FIG. 4. A responding device may receive the MRTS 404 frame and determine collision-free channels and indicate bandwidth in the MCTS 410 frame. The bandwidth intended to be used by a device may be indicated in a bandwidth field of the MRTS 404 frame and the MCTS 410 frame using a number of bits. For example, two bits may be used in the bandwidth field of the MRTS 404 frame and/or the MCTS 410 frame to indicate that a selected bandwidth will be used for a subsequent transmission. The initiating device and the responding device may monitor all channels in the embodiment of FIG. 4, though the embodiment is not so limited.

Figure 5:
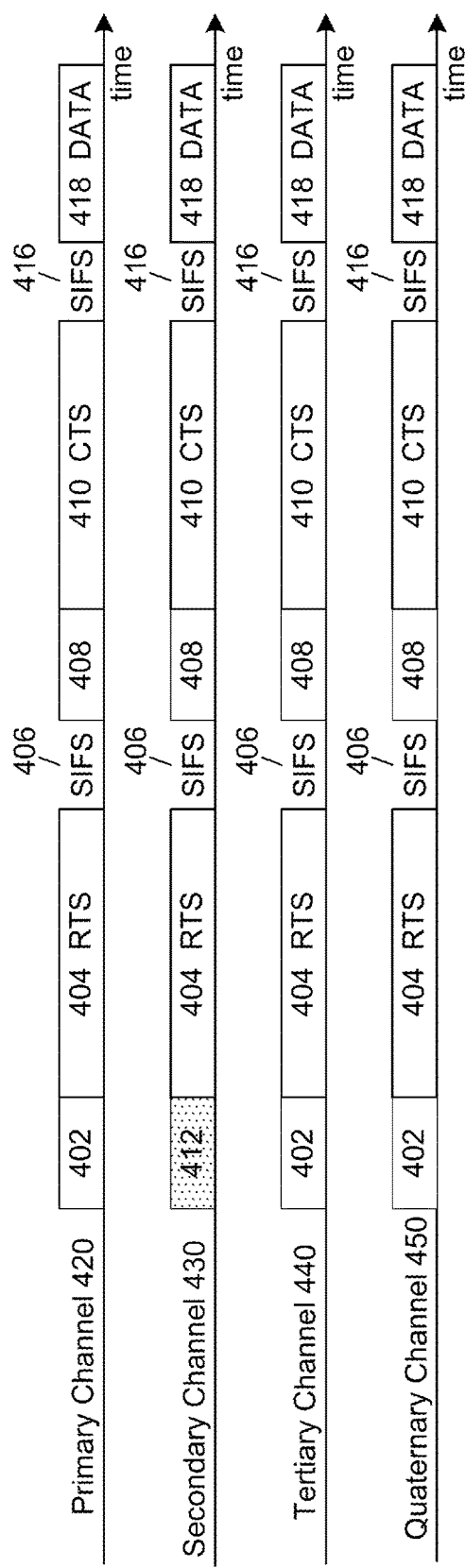
FIG. 5 is a block diagram illustration of collision detection over a plurality of channels, in accordance with some demonstrative embodiments.

FIG. 5 is a block diagram illustration of collision detection over a plurality of channels, in accordance with some demonstrative embodiments. An initiating device such as the VHT communication STA 102 or the VHT AP 104 uses a RTS frame 504 including a RTS preamble 502 over a plurality of channels comprising the primary channel 420 and a number of non-primary channels including the secondary channel 430, the tertiary channel 440, and the quaternary channel 450. Fewer or additional channels may be used in alternate embodiments.

To improve energy efficiency and to reduce hardware complexity, a responding device such as the VHT communication STA 102 or the VHT AP 104 may monitor only a subset of available channels on a continuous or semi-continuous basis to determine if the subset of available channels are idle and to sense RTS frames 404. For example, the responding device may select some but not all of the channels 420, 430, 440, and 450 for packet reception to detect collisions on the selected channels. If a collision is detected on one of the selected channels, the initiating device can reduce a transmission bandwidth of subsequent packets or frames. A corrupted preamble 512 sent by the initiating device as part of the RTS 504 frame along the secondary channel 430 may not be detected if the responding device selectively monitors a subset of channels that excludes the secondary channel 430. As a result, a CTS 510 frame is sent despite the collision on the secondary channel 430 and a bandwidth used for transmission is not disturbed or modified because the collision was not detected on a channel monitored by the responding device.

Figure 6:
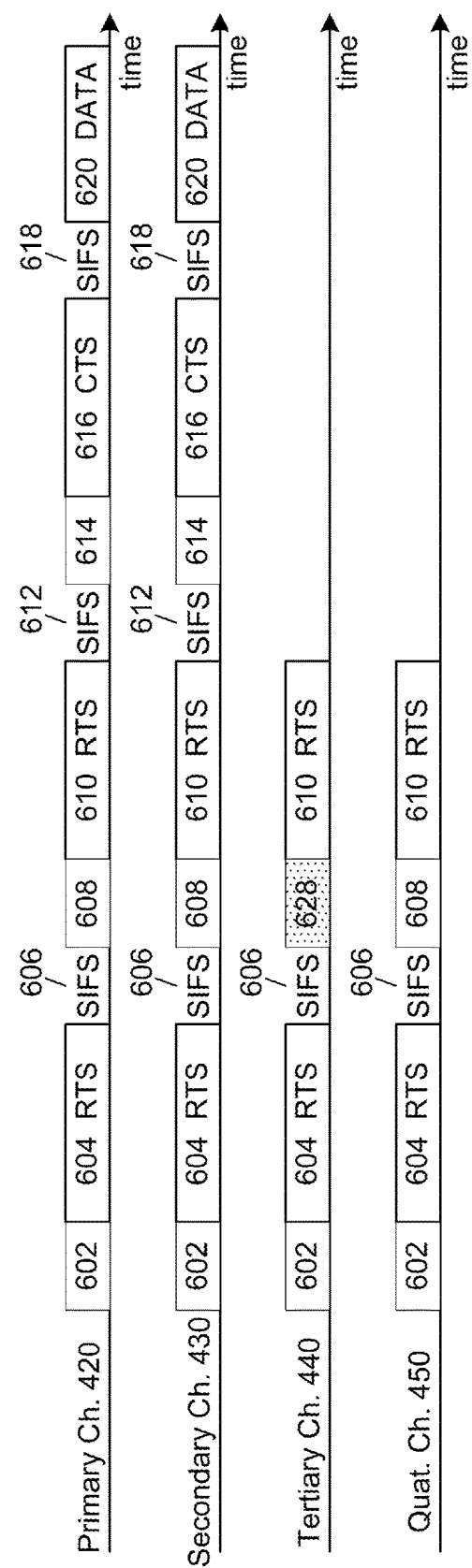
FIG. 6 is a block diagram illustration of collision detection over a plurality of channels, in accordance with some demonstrative embodiments.

FIG. 6 is a block diagram illustration of collision detection over a plurality of channels, in accordance with some demonstrative embodiments. An initiating device such as the VHT communication STA 102 or the VHT AP 104 uses a RTS frame 504 including a RTS preamble 502 over a plurality of channels comprising the primary channel 420 and a number of non-primary channels including the secondary channel 430, the tertiary channel 440, and the quaternary channel 450. In embodiments, the primary channel 420 is monitored on a continuous or semi-continuous basis. However, the remaining channels 430, 440, and 450 are not monitored, for example to save energy or to reduce hardware complexity.

Prior to establishing a transmission opportunity (TXOP), the initiating device transmits a RTS 604 frame over all of the available channels 420, 430, 440, and 450. Fewer or additional channels may be used in alternate embodiments. A RTS preamble 602, as part of the RTS 604 frame, indicates the available bandwidth and, in particular embodiments, an association identifier (AID) of the responding device. The bandwidth may be indicated in the RTS preamble 602 using a number of bits. For example, for four available channels, two bits may be used to indicate the available bandwidth, or the bandwidth detected as idle by the initiating device.

Upon receiving the RTS preamble 602 and detecting a match of the AID, the responding device switches from a first bandwidth mode to a second bandwidth mode. In embodiments, the responding device may also determine if the channels are idle prior to receiving the RTS frame 604. The responding device may switch from a 20 MHz mode to an 80 MHz mode based on the bandwidth indicated in the RTS preamble 602. After switching modes, the responding device monitors channels corresponding to the bandwidth indicated in the RTS preamble 602. Following the short interframe space (SIFS) 606, the initiating device transmits a RTS 610 over all the channels corresponding to the available bandwidth. The responding device may detect a collision over the tertiary channel 440, resulting in a corrupted preamble 628 which is detected by the responding device. After receiving the RTS 610 frames over all the available channels, the responding device responds with CTS 616 frames over collision free channels which may be a subset of the available channels including the primary channel 420 and the secondary channel 430. In response to detecting the collision on the tertiary channel, the responding device may switch off an upper band circuit corresponding to the tertiary channel 440 and the quaternary channel 450. In an alternate embodiment, a collision may be detected along the quaternary channel 450, resulting in the initiating device transmitting along the primary channel 420 and the secondary channel 430 as illustrated in FIG. 6.

FIG. 7 is a block diagram illustration of devices and methods for collision detection in wideband transmission as described earlier in reference to FIG. 2 through FIG. 6. In element 702, a device such as the wireless communication device of FIG. 2, i.e. 202 or 206, configured for wideband communication monitors for traffic over a plurality of channels, e.g. primary channel 420, secondary channel 430, tertiary channel 440, and quaternary channel 450. In element 704, the device determines that one or more channels of the plurality of channels are idle. In element 706, the device transmits a RTS frame over the one or more idle channels, wherein the one or more idle channels includes a primary channel 420, and each RTS frame indicates available bandwidth at the transmitter and comprises a preamble. A CTS frame is received in element 708 over the primary channel 420, wherein the CTS frame indicates a number of available channels and available bandwidth at a responder. Data is transmitted by the device over the number of available channels indicated by the CTS frame in element 710.

FIG. 8 is a block diagram illustration of methods for collision detection in wideband transmission as described earlier in reference to FIG. 2 through FIG. 6. In element 802, a device such as the wireless communication device of FIG. 2, i.e. 202 or 206, configured for wideband communication determines if a primary channel 420 and a number of non-primary channels (e.g. 430-450) are idle. In element 804, the device receives a RTS frame over the primary channel 420, wherein the RTS frame indicates an available bandwidth at the device. The device transmits a CTS frame over a number of the primary channel 420 and one or more non-primary channels in element 806 based at least in-part on whether the primary channel 420 and the non-primary channels are idle, wherein the CTS frame indicates an available bandwidth at a responder. In element 808, the device receives data over at least a subset of the number of the one or more primary channel 420 and non-primary channels.

The operations discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

Unless specifically stated otherwise, as apparent from the following discussions, it is appreciated that throughout the specification discussions utilizing terms such as "processing," "computing," "calculating," "determining," "selecting," "decoding," or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" as used throughout the specification describes two or more components, devices, elements, parameters and the like.

The term "device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "device" may optionally include a wired service.

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:

1. A very high throughput (VHT) station (STA) configured for dynamic bandwidth operation over a primary channel and a plurality of secondary channels, wherein the VHT STA comprises a processor and transceiver arranged to:
   monitor for traffic in a primary channel and a plurality of secondary channels;
   determine that the primary channel is idle and one or more of the secondary channels is idle;
   select an available bandwidth from at least channel widths of 20 MHz, 40 MHz, 80 MHz, and 160 MHz for one of a 20 MHz, a 40 MHz, an 80 MHz, or a 160 MHz channel, respectively, the selected available bandwidth corresponding to the primary channel and the one or more secondary channels determined to be idle,
   wherein the selected available bandwidth for the 40 MHz channel comprises two adjacent 20 MHz channels, wherein the selected available bandwidth for the 80 MHz channel comprises four adjacent 20 MHz channels, and wherein the selected available bandwidth for the 160 MHz channel comprises two non-adjacent 80 MHz channels;
   transmit a single multichannel request to send (RTS) frame on the primary channel and the one or more secondary channels of the selected available bandwidth, wherein the multichannel RTS frame is a single frame occupying the channels of the selected available bandwidth,
   wherein the processor is configured to encode the multichannel RTS frame to indicate the channels occupied by the multichannel RTS frame corresponding to the selected available bandwidth, and
   wherein the processor is further configured encode the multichannel RTS frame with an indicator to indicate either static bandwidth operation or dynamic bandwidth operation, wherein when the multichannel RTS frame indicates the dynamic bandwidth operation, a responding station is to select that a bandwidth less than or equal to the bandwidth occupied by the multichannel RTS frame for transmission of a clear to send (CTS) frame, and wherein when the multichannel RTS frame indicates the static bandwidth operation, the responding station is to use a bandwidth equal to the bandwidth occupied by the multichannel RTS for transmission of the CTS frame;
   receive a CTS frame from the responding station, wherein if the multichannel RTS frame indicated the dynamic bandwidth operation, the CTS frame indicates a bandwidth less than or equal to the bandwidth occupied by the multichannel RTS frame, wherein when the indicated bandwidth is less than the bandwidth occupied by the multichannel RTS frame, the CTS frame indicates a subset of channels of the selected available bandwidth, the subset of channels comprising the primary channel and up to one of the one or more of the secondary channels on which the multichannel RTS frame was transmitted, and wherein if the multichannel RTS frame indicated static bandwidth operation, the CTS frame is received within the bandwidth occupied by the multichannel RTS frame; and
   transmit a data frame on the channels indicated in the CTS frame,
   wherein the VHT STA is configured for operation in Unlicensed National Information Infrastructure (UNII) radio bands including a UNII-2 band and a UNII-3 band, and wherein for the 160 MHz channel comprising two non-adjacent 80 MHz channels, one of the non-adjacent 80 MHz channels utilizes channel resources in the UNII-3 band and the other of the non-adjacent 80 MHz channels utilizes channel resources in the UNII-2 band.

2. The wireless communication unit of claim 1, wherein the CTS frame indicates available bandwidth at the responding station corresponding to the available channels.

3. A non-transitory computer-readable storage medium that stores instructions for execution by one or more processors to perform operations for operating a very-high throughput (VHT) communication station (STA) in a wireless network, the operations to configure the VHT STA for dynamic bandwidth operation, the instructions to configure the one or more processors to:
   monitor for traffic in a primary channel and a plurality of secondary channels;
   determine that the primary channel is idle and one or more of the secondary channels is idle;
   select an available bandwidth from at least channel widths of 20 MHz, 40 MHz, 80 MHz, and 160 MHz for one of a 20 MHz, a 40 MHz, an 80 MHz, or a 160 MHz channel, respectively, the selected available bandwidth corresponding to the primary channel and the one or more secondary channels determined to be idle,
   wherein the selected available bandwidth for the 40 MHz channel comprises two adjacent 20 MHz channels, wherein the selected available bandwidth for the 80 MHz channel comprises four adjacent 20 MHz channels, and wherein the selected available bandwidth for the 160 MHz channel comprises two non-adjacent 80 MHz channels;
   transmit a single multichannel request to send (RTS) frame on the primary channel and the one or more secondary channels of the selected available bandwidth, wherein the multichannel RTS frame is a single frame occupying the channels of the selected available bandwidth, wherein the processor is configured to encode the multichannel RTS frame to indicate the channels occupied by the multichannel RTS frame corresponding to the selected available bandwidth, and wherein the processor is further configured encode the multichannel RTS frame with an indicator to indicate either static bandwidth operation or dynamic bandwidth operation, wherein when the multichannel RTS frame indicates the dynamic bandwidth operation, a responding station is to select that a bandwidth less than or equal to the bandwidth occupied by the multichannel RTS frame for transmission of a clear to send (CTS) frame, and wherein when the multichannel RTS frame indicates the static bandwidth operation, the responding station is to use a bandwidth equal to the bandwidth occupied by the multichannel RTS for transmission of the CTS frame;

receive a CTS frame from the responding station, wherein if the multichannel RTS frame indicated the dynamic bandwidth operation, the CTS frame indicates a bandwidth less than or equal to the bandwidth occupied by the multichannel RTS frame, wherein when the indicated bandwidth is less than the bandwidth occupied by the multichannel RTS frame, the CTS frame indicates a subset of channels of the selected available bandwidth, the subset of channels comprising the primary channel and up to one of the one or more of the secondary channels on which the multichannel RTS frame was transmitted, and wherein if the multichannel RTS frame indicated static bandwidth operation, the CTS frame is received within the bandwidth occupied by the multichannel RTS frame; and transmit a data frame on the channels indicated in the CTS frame, wherein the VHT STA is configured for operation in Unlicensed National Information Infrastructure (UNII) radio bands including a UNII-2 band and a UNII-3 band, and wherein for the 160 MHz channel comprising two non-adjacent 80 MHz channels, one of the non-adjacent 80 MHz channels utilizes channel resources in the UNII-3 band and the other of the non-adjacent 80 MHz channels utilizes channel resources in the UNII-2 band.

4. The non-transitory computer-readable storage medium of claim 3, wherein the CTS frame indicates available bandwidth at the responding station corresponding to the available channels.

* * * * *